United States Patent [19]

Wegmann

[11] Patent Number: 5,289,488
[45] Date of Patent: Feb. 22, 1994

[54] PUMP ASSEMBLY FOR A GAS DISCHARGE LASER

[75] Inventor: Heinz Wegmann, Ottobrunn, Fed. Rep. of Germany

[73] Assignee: WB Laser Wegmann-Baasel Laser und elektrooptische Geräte GmbH, Munich, Fed. Rep. of Germany

[21] Appl. No.: 948,212

[22] Filed: Sep. 21, 1992

[30] Foreign Application Priority Data

Sep. 26, 1991 [DE] Fed. Rep. of Germany ....... 4132148

[51] Int. Cl.⁵ .............................................. H01S 3/22
[52] U.S. Cl. .......................................... 372/59; 372/55
[58] Field of Search ........................... 372/58, 59, 55

[56] References Cited

U.S. PATENT DOCUMENTS

| | | | |
|---|---|---|---|
| 4,550,409 | 10/1985 | Kaye | 372/58 |
| 4,718,071 | 1/1988 | Steffen | 372/58 |
| 4,803,693 | 2/1989 | Schramm | 372/58 |
| 4,958,356 | 9/1990 | Tanuma | 372/58 |
| 5,136,605 | 8/1992 | Basting et al. | 372/59 |

Primary Examiner—Léon Scott, Jr.
Attorney, Agent, or Firm—Brumbaugh, Graves, Donohue & Raymond

[57] ABSTRACT

A pump assembly for a gas discharge laser comprises a first pump ($P_1$) which has a relatively high suction capacity and relatively short service life and a second pump ($P_2$) which has a relatively low suction capacity and relatively longer service life.

2 Claims, 2 Drawing Sheets

PUMP ASSEMBLY FOR A GAS DISCHARGE LASER

FIELD OF THE INVENTION

The instant invention relates to a pump assembly for a gas discharge laser, comprising first and second pumps and providing for make-up gas supply to the gas discharge laser during operation.

BACKGROUND OF THE INVENTION

Gas discharge lasers or gas lasers of the most diverse kind are known, such as $CO_2$ lasers, $N_2$ lasers, and excimer lasers. The laser active medium (i.e. a medium with so-called population inversion) in those cases is generated by gas discharge. It is likewise known to employ lasers of the above kind in pulsed or continuous wave (cw) operation.

EP 0 374 287 A1 discloses a vacuum system for a gas discharge laser, comprising a pump assembly which consists of two pumps. Its purpose, however, is to purify the laser gas and reduce the requirement for make-up gas.

The gas discharge always is effected with a certain gas mixture. In the case of the $CO_2$ laser, for instance, the gas discharge chamber essentially contains carbon dioxide. Chemical reactions take place in the plasma produced by the gas discharge, whereby the working gas of the laser is "consumed". Chemical reactions also may take place at the walls of the gas discharge chamber. Finally, also contaminations in the gas (e.g. caused by desorption from the walls) may lead to chemical reactions with the working gas of the laser, whereby the working gas is consumed and/or undesirable reaction products are formed which may impair the laser performance. Reaction products also may deposit as contaminants on the optical component parts of the laser.

Prior to the entry of the laser working gases (i.e $CO_2$, $N_2$, or precious gases and halogens, for example) into the gas discharge chamber of the laser, the latter must be evacuated before laser operation begins. That requires some kind of arrangement of pumps. However, the need for a pump assembly exists not only before the lasing starts but continues to exist during operation of the laser. It is known in the art to make up the laser gas continuously during operation of the laser because of the "consumption" of the working gas of the laser and the undesirable contaminations mentioned above. This means that normally fresh working gas is introduced continuously (or batchwise) into the laser cavity. For instance, a $CO_2$ laser typically receives up to some 100 liters of fresh laser-gasmix per hour. A corresponding quantity of gas must be pumped off constantly in view of the fact that the gas pressure in the gas discharge chamber, at the same time, must be kept substantially constant.

Hydrocarbons (oil) are a particularly undesirable contamination in the gas of the gas discharge chamber of the laser. It is especially in the gas discharge that the hydrocarbons react and reaction products accumulate on the optical members of the laser resonator, in particular the mirrors, whereby the laser performance is reduced.

Rotary vane pumps, with oil lubrication, are known in the art as pump assemblies for gas discharge lasers, especially $CO_2$ lasers. Their rotary vane is sealed by oil with respect to the pump wall so as to increase the pumping capacity and prolong the service life of the pump. The service life of the pump is understood to be the length of time for which a pump typically can run between two maintenance intervals. In other words the service life is the typical maintenance-free working period of a pump. The service life and the pumping performance of a rotary vane pump lubricated with oil are relatively high. Yet the pump lubricating oil can get into the gas discharge chamber of the laser where it may have the disadvantageous effects described above. Oil traps can be provided between the pump and the cavity in order to prevent hydrocarbons from penetrating into the gas discharge chamber, they may be embodied by a zeolite screen or a cooling trap which may operate with liquid nitrogen, for instance. Such measures, however, are costly and require intensive maintenance, and that is not desirable when lasers are put to industrial use.

It is likewise known, in principle, to operate rotary vane pumps without oil. Such pumps then are referred to as "operating dry". Dry-operating rotary vane pumps do have the advantage of not involving any hydrocarbons which may enter into the gas discharge chamber of the laser, because of the operation without oil. However, they suffer the disadvantage of having a relatively shorter service life. On the other hand, the reduction in suction performance of a pump operating dry, as compared to a rotary vane pump with oil lubrication, is rather small.

As already mentioned, undesirable gases must be removed entirely from the discharge chamber before starting a gas discharge laser. This evacuation of the chamber or cavity requires a relatively great suction capacity if unpracticably long pumping times are to be avoided. On the other hand, stationary operation of the laser requires only a relatively small suction capacity to pump off quantities of gas in correspondence with the make-up gas supplied. Oil-free diaphragm pumps are sufficient to meet this demand for minor suction performance.

SUMMARY OF THE INVENTION

It is the object of the invention to provide an inexpensive pump assembly requiring little maintenance and having a long service life for use with the gas discharge chamber of a gas discharge laser.

This object is met, in accordance with the invention, by the features recited in claim 1.

With such a pump assembly, initially the first pump may be used to evacuate the gas discharge chamber upon starting of the laser, as this is facilitated by the high suction capacity of the pump. Subsequently, the first pump may be shut down and the second pump be used during the long-term operation of the laser, as the suction capacity of this pump is sufficient for pumping off gas quantities which correspond to the amount of make-up gas supplied and, moreover, the second pump has a long service life. The relatively short service life of the first pump does not do any harm since that pump only operates for short periods at a time.

In accordance with a preferred modification of the invention it is provided that the first pump is a dry-operating rotary vane pump and the second one is a diaphragm pump. This arrangement has the advantage of largely keeping the gas discharge chamber free of oil.

In accordance with another preferred modification of the invention a third pump is provided serving to circulate the gas contained in the gas discharge chamber, and this pump is greased. Rather being lubricated by oil, the third pump is greased. A greased turbine compressor or a greased Roots blower are especially well suited for use as the third pump which operates to cause circulation of the gas in the gas discharge chamber of the laser.

BRIEF DESCRIPTION OF THE DRAWING

The invention will be described further, by way of example, with reference to the accompanying drawings, in which.

DESCRIPTION OF THE PREFERRED EMBODIMENTS

Figure 1:
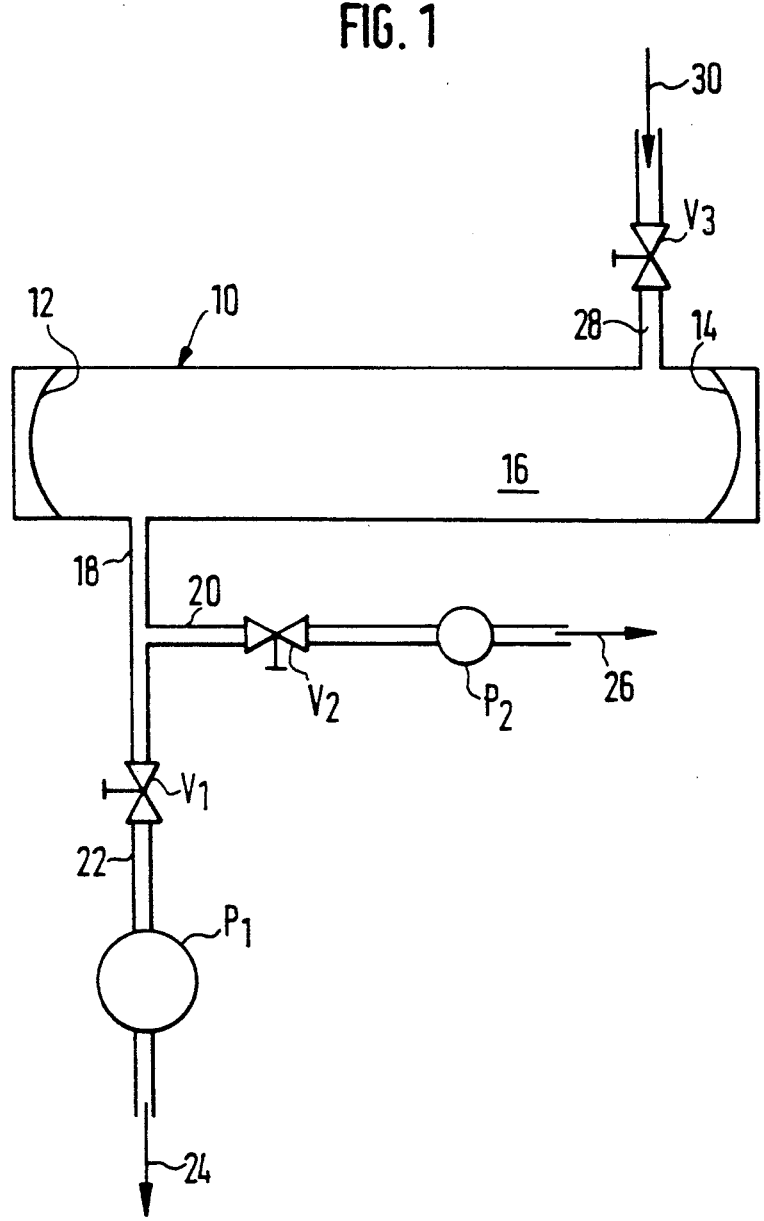
FIG. 1 is a diagrammatic presentation of a pump assembly acting on the gas discharge chamber of a gas discharge laser.

FIG. 1 is a diagrammatic presentation of a gas discharge laser 10 including reflector and output mirrors 12, 14. The gas laser may be a $CO_2$ laser, for example.

The gas discharge chamber 16 of the laser can be connected by a conduit 18 to two different pumps $P_1$ and $P_2$.

Communication between the pumps $P_1$ and $P_2$ and the gas discharge chamber 16 may be established and interrupted selectively by means of valves $V_1$ and $V_2$. A branch line 20 leads from conduit 18 through valve $V_2$ to the second pump $P_2$. Another branch line 22 passes through valve $V_1$ to the first pump $P_1$.

A feedpipe 28 is provided to introduce make-up gas into the gas discharge chamber 16 of the laser. The gas supplied through it flows in the direction of arrow 30, and a valve $V_3$ may be opened or closed selectively.

Prior to starting the laser, valve $V_3$ is closed and valve $V_1$ is opened. The first pump $P_1$ is turned on, with valve $V_2$ in closed condition, so as to evacuate the gas discharge chamber 16 of the laser. The first pump $P_1$ is embodied by a rotary vane pump operating dry and accomplishing the evacuation of the gas discharge chamber 16 free of oil. The pumping time this requires is very short since the pump $P_1$ has a relatively high suction capacity. Subsequently, valve $V_1$ can be closed and operation of the first pump $P_1$ be terminated. Then valve $V_3$ is opened and laser gas is introduced through the feedpipe 28, in the direction of arrow 30, into the gas discharge chamber 16 of the laser. When sufficiently high gas pressure is attained, the valve $V_3$ is adjusted so that a desired reduced flow rate of, for instance, 100 l/h is obtained. Valve $V_2$ is opened (with valve $V_1$ in closed state) and the second pump $P_2$ is turned on to establish a constant pressure of the working gas of the laser in the gas discharge chamber. In the embodiment illustrated, a diaphragm pump of sufficiently high suction capacity (here: 100 l/h) and relatively long service life is used as the second pump $P_2$.

The first and second pumps $P_1$ and $P_2$ convey the pumped gases in the direction of arrows 24 and 26, respectively. Depending on the kind (price, environmental hazard, etc.) of the gas conveyed, arrow 26 may lead, for example, to a gas scrubber (not shown) and establish a link with feedpipe 28 (arrow 30) to provide a closed circuit. Yet it is also conceivable to have the gas conveying directions 24 or 26 lead into the open or into a specifically designated space, if desired, upon filtering.

As the first pump $P_1$ need be run only when the laser is started, it is used sparingly and its rather short service life is sufficient.

Figure 2:
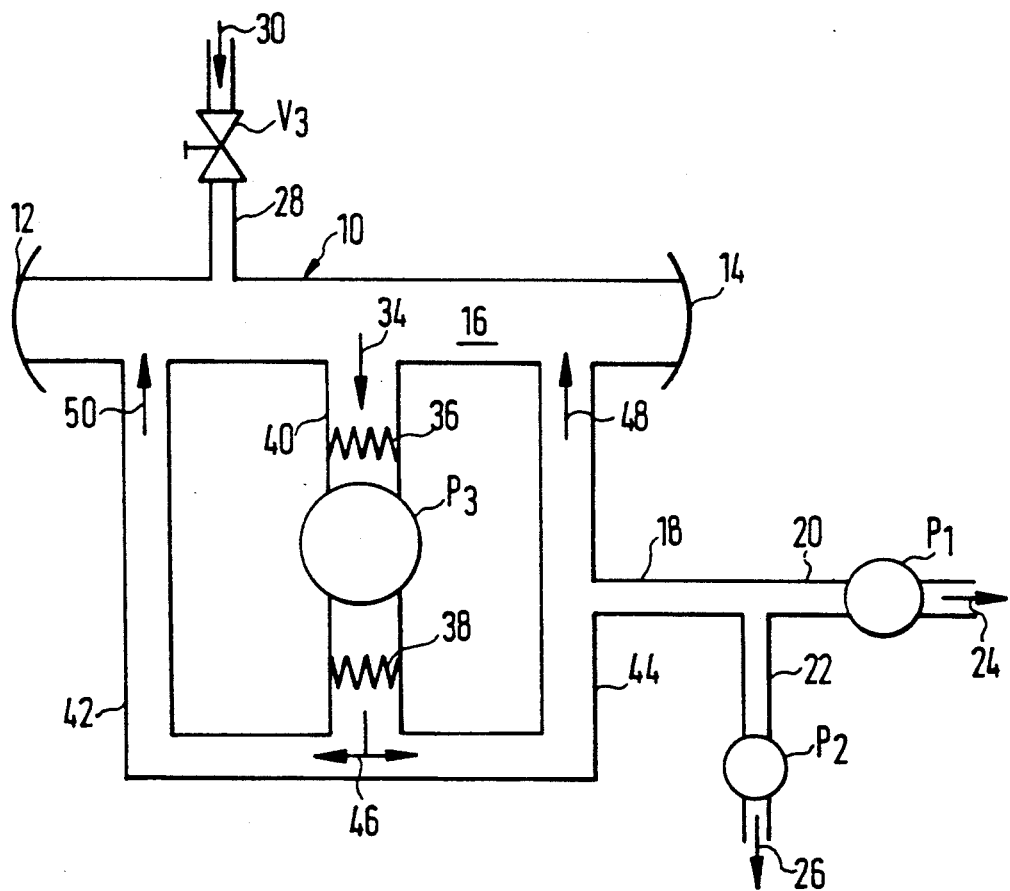
FIG. 2 shows another embodiment of a pump assembly acting on the gas discharge chamber of a gas discharge laser.

FIG. 2 shows another embodiment of a pump assembly for subjecting a gas discharge laser, e.g. a $CO_2$ laser to pumping action. Corresponding structural members are marked by the same reference numerals in FIGS. 1 and 2 and the respective description is not repeated.

FIG. 2 presents a gas discharge chamber 16 on which pumps $P_1$ and $P_2$ may exert their pumping action, as described above with reference to FIG. 1. Valves $V_1$ and $V_2$ are not shown again in FIG. 2, as being associated with pumps $P_1$ and $P_2$, respectively. In addition to pumps $P_1$ and $P_2$, FIG. 2 shows a third pump $P_3$ which causes the gas to circulate in the gas discharge chamber 16. The aspiration of the pump $P_3$ is in the direction of arrow 34 so that gas is sucked out of the gas discharge chamber 16. The gas passes through cooling means 36 upstream of the pump $P_3$ and through cooling means 38 downstream of the pump $P_3$. As indicated by double arrow 46, the gas conveyed by pump $P_3$ from line 40 is divided into two branch lines 42, 44 and flows back into the gas discharge chamber 16, as marked by arrows 48 and 50, respectively. The additional pump $P_3$ thus causes circulation of the gas in the pulsed gas discharge laser 10, with the gas being cooled at the same time. Especially suitable as the additional pump $P_3$ are a turbine compressor or a Roots blower both of which, however, are not operated with oil lubrication but instead are greased so as to keep the gas discharge chamber 16 free of oil as best as possible.

What is claimed is:

1. A pump assembly for a gas discharge laser having a gas discharge chamber comprising
    first and second oil-free pumps, said first pump having a relatively high suction capacity and a relatively short service life and said second pump having a relatively low suction capacity and a relatively long service life, and
    means selectively coupling one or the other of said pumps to said gas discharge chamber, said selective means being actuated to connect said first pump to said chamber to evacuate said chamber during start-up of said laser and to connect said second pump to said chamber after gas has been introduced into said chamber to pump off an amount of gas therefrom corresponding to the amount of make-up gas supplied to said chamber during long-term operation of said laser.

2. The pump assembly as claimed in claim 1, characterized in that said first pump is a dry-operating rotary vane pump and said second pump is a diaphragm pump.

* * * * *